United States Patent [19]

Watts

[11] Patent Number: 4,997,067
[45] Date of Patent: Mar. 5, 1991

[54] FRICTION APPARATUS

[75] Inventor: Anthony P. Watts, Landisville, Pa.

[73] Assignee: Fenner America, Inc., Manheim, Pa.

[21] Appl. No.: 371,429

[22] Filed: Jun. 26, 1989

[51] Int. Cl.[5] .............................................. F16D 65/06
[52] U.S. Cl. .............................. 188/251 A; 188/77 R;
188/250 B; 188/382; 192/107 M
[58] Field of Search .......... 188/251 A, 251 M, 251 R,
188/73.1, 249, 259, 218 XL, 218 R, 73.2, 71.1,
382; 192/107 R, 107 T, 107 M; 106/36;
428/257, 64, 65, 222, 272, 365, 252, 265;
57/210, 232, 238; 156/184, 310, 148

[56] References Cited

U.S. PATENT DOCUMENTS

| | | | |
|---|---|---|---|
| 2,599,826 | 6/1952 | Halstead et al. | 188/251 A X |
| 2,702,770 | 2/1955 | Steck | 188/251 A X |
| 2,728,700 | 12/1955 | Gatke | 188/251 A X |
| 2,809,130 | 10/1957 | Rappaport | 188/251 A X |
| 3,085,667 | 4/1963 | Lang | 192/66 |
| 3,365,041 | 1/1968 | Stormfeltz | 188/251 A X |
| 3,526,306 | 9/1970 | Bentz et al. | 188/251 A X |
| 3,617,426 | 11/1971 | Grundman | 188/251 A X |
| 3,664,472 | 5/1972 | Martini et al. | 192/107 M X |
| 3,684,062 | 8/1972 | Johnson | 188/251 |
| 3,710,905 | 1/1973 | Grundman | 188/251 A X |
| 3,712,428 | 1/1973 | Marin | 188/251 A |
| 3,765,978 | 10/1973 | Matt | 156/148 |
| 3,860,094 | 1/1975 | Breton | 188/250 B X |
| 3,868,002 | 2/1975 | Babled | 188/250 B X |
| 4,074,512 | 2/1978 | Matt | 57/140 |
| 4,291,794 | 9/1981 | Bauer | 192/107 M |
| 4,344,615 | 7/1982 | Carlson | 272/67 |
| 4,384,640 | 5/1983 | Trainor et al. | 192/107 M |
| 4,539,240 | 9/1985 | Wargin | 192/107 M X |
| 4,585,098 | 4/1986 | Pike | 188/250 B X |
| 4,593,802 | 6/1986 | Danko, Jr. | 192/107 |
| 4,700,823 | 10/1987 | Winckler | 192/107 M |
| 4,728,552 | 3/1988 | Jensen, Jr. | 188/251 A X |
| 4,762,216 | 8/1988 | Pusatcioglu et al. | 188/251 A X |
| 4,778,548 | 10/1988 | Fox et al. | 188/251 A X |
| 4,781,275 | 11/1988 | Olsen | 188/251 A |

OTHER PUBLICATIONS

Fenner Manheim Product Bulletin (1988).

Primary Examiner—Douglas C. Butler
Attorney, Agent, or Firm—Woodcock Washburn Kurtz Mackiewicz & Norris

[57] ABSTRACT

A friction apparatus which includes a liner having a friction surface. The liner includes a fabric having fluorine fibers. The liner also comprising a resin.

15 Claims, 4 Drawing Sheets

FRICTION APPARATUS

BACKGROUND OF THE INVENTION

This invention relates generally to friction apparatus and more particularly to friction apparatus having a friction surface comprised of a fabric having fluorine fibers and a resin.

It may be explained here that various friction compositions or materials have been utilized in brakes, clutches and the like depending on the type of load, the frictional heat of operation and other operating parameters. Historically, asbestos, alone or in combination with other materials, was considered the ideal clutch/brake material because of its ability to withstand high temperatures and its high coefficient of friction. A high coefficient of friction is generally considered essential in the selection of clutch/brake lining materials and one would not normally choose a lining material having a low coefficient of friction as the friction surface of a clutch or brake.

It has been surprisingly discovered, however, that a material which has heretofore been utilized as a bearing liner material because of among other factors, its low coefficient of friction and low stick slip properties, is ideally suited for a friction surface in a friction tensioning apparatus, clutch, brake or the like.

SUMMARY OF THE INVENTION

The friction apparatus in accordance with the invention comprises a support means and a lining member. The lining member comprises a fabric including fluorine fibers, and a cured synthetic resin.

Friction apparatus in accordance with the invention have high load-bearing capacity, long-wearing capability and are able to operate with uniform torque through a wide temperature range and without stick slip, i.e., the static and dynamic coefficients of friction of the lining member are similar. These advantages of the invention together with a number of other favorable attributes thereof will become more apparent upon consideration of the ensuing specification, particularly when considered in light of the appended drawings, directed toward particular embodiments of the invention but also illustrative of the underlying concepts thereof.

DETAILED DESCRIPTION OF THE PREFERRED EMBODIMENTS

Figure 1:
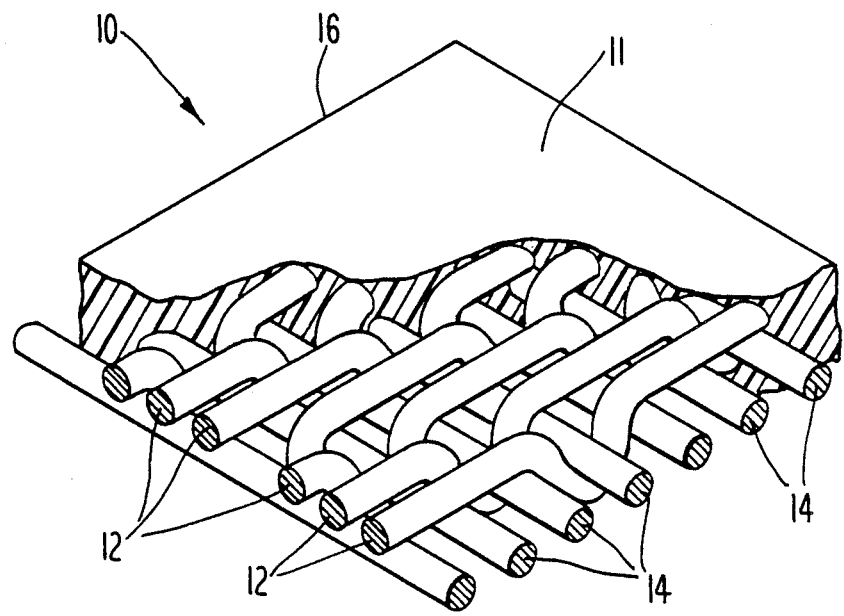
FIG. 1 is an enlarged perspective diagrammatic view, with parts broken away, of woven fabric having fluorine fibers and a cured synthetic resin in accordance with the invention.

Referring now the drawing, wherein like reference numerals refer to like parts throughout the several views, and in particular to FIG. 1, there is shown generally at 10 a lining member in accordance with the invention. The lining member 10 comprises a sheet-like body with a friction surface 11. The sheet-like body includes a woven fabric, which includes warp yarns 12 and filling yarns 14, and a cured synthetic resin 16. The woven fabric of lining member 10 is constructed to present the warp yarns 12 at the wear face of friction surface 11. The filling yarns 14 comprise the support or reinforced backing of the lining member 10. The woven fabric of warp and filling yarns is impregnated with a thermosetting or thermoplastic resin 16 for support. The resulting high-strength composite can be cut to size and is easily secured to or bonded to any flat or curved surface with the resin, a suitable adhesive or other fastening means.

Figure 2:
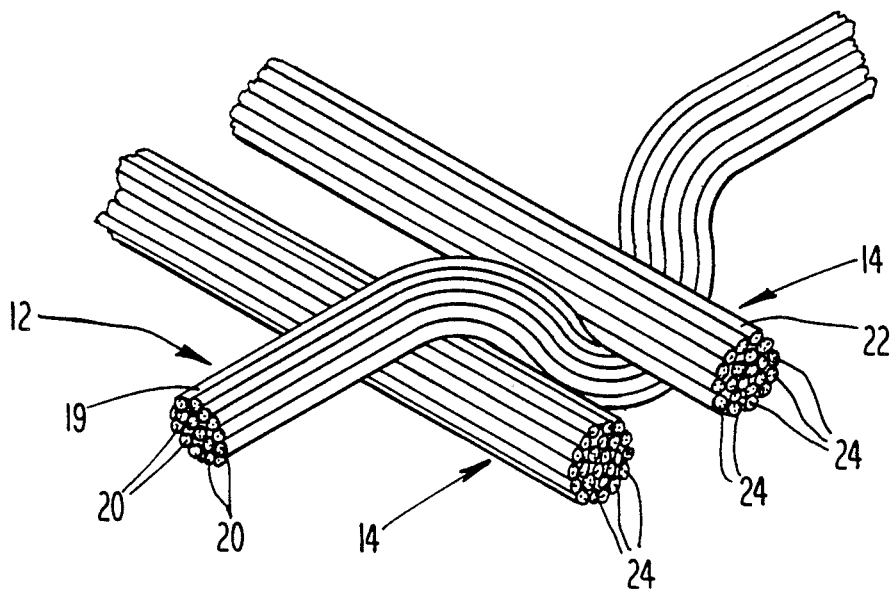
FIG. 2 is an enlarged diagrammatic simplified fragmentary perspective view illustrating the fibers making up the yarn of the woven fabric illustrated in FIG. 1.

As seen in FIG. 2, the warp yarn 12 is made of a bundle 19 of filaments or fibers 20 and the backing, reinforcing or filling yarn 14 is made of a bundle 22 of filaments or fibers 24. The fibers 20 of the warp yarn 12 are fluorine fibers or a combination of fluorine fibers and other suitable fibers. Such fluorine fibers are available as Teflon which is a trademark of E.I. DuPont Company for its tetrafluorethylene (TFE) filament or as Goretex which is a trademark of W.L. Gore Company. Other suitable fibers for use in combination with the Teflon fibers in the warp yarn 12 are polyester fibers, such as Dupont brand Dacron and Kodak's brand Kodel, aramid fibers, such as Dupont brand Kevlar, nylon fibers such as Dupont, brand Nomex, cotton fibers, PEEK and P.B.I. as manufactured by Celanese Corporation, PPS fibers as manufactured by Phillips Ryton Corporation, glass fibers, ceramic fibers, asbestos fibers, steel fibers, stainless steel fibers, bronze fibers, carbon fibers, graphite fibers or boron fibers or a combination of one or more of such fibers. These same fibers may be used alone or in combinations as the fibers 24 of the backing, reinforcing or filing yarn 14. Preferably the warp yarn 12 is comprised of Teflon fibers and one or more of the above mentioned reinforcing fibers. As for example, the warp yarn 12 may have a content ratio of about 50% Teflon to 50% reinforcing fibers. Of course, other ratios of Teflon to reinforcing fibers may be utilized depending upon the desired coefficient of friction, heat resistance, mechanical strength, wear resistance and heat stability of the resultant woven fabric and the resultant lining member.

The fibers 20 and 24, of each bundle 19 and 22, respectively, may be twisted or have a zero twist or may be a combination of twisted and zero twist fibers. In any event, the fibers 20, either a single type fiber, or a combination of fibers, i.e., a multicomponent warp yarn, as described above, are formed into the yarn 12. Likewise, the fibers 24, either a single type fiber or a combination of fibers, i.e. a multicomponent reinforcing yarn, as described above, are formed into the yarn 14.

The yarns 12 and 14 are then woven into the fabric shown in FIG. 1 which, as shown, comprises a satin-weave fabric, with a 3:1 face, i.e. the ratio of Teflon fibers to reinforcing fibers at the face of the fabric is 3 to 1 or the warp yarns weave over 3 and under 1 filling yarn throughout the fabric. It is to be understood, however, that any ratio desired may be chosen and that the weave does not have to be a satin-weave. Furthermore, the advantages in accordance with the invention and a similar effect can be obtained by reversing the warp and filling yarns such that the warp yarns become the binders and the filling yarns become the TFE friction face; in other words, the underside of the liner would be used as a friction face. The woven fabric comprising the yarns 12 and 14, however constructed, is then impregnated with a suitable supporting or reinforcing resin and cured. Thermosetting resins such as various phenolics and polymides commercially available are suitable. As for example, FE 7119 brand resin, manufactured by H.B. Fuller Company of Minneapolis, Minn., would be a suitable resin. A thermoplastic resin such as PEEK resin manufactured by Celanese Corporation or PTFE resin manufactured by E.I. DuPont Company could also be used. The resulting composite is a flexible sheetlike lining material having a thickness in the range of 0.38 mm to 0.76 mm and preferably 0.50 mm which is suitable for use in various applications, examples of which will be set forth with reference to FIGS. 3–12. Also, the liner can be laminated in thickness up to about 13 mm or larger for various applications in accordance with the invention. A method of making the lining member 10 is disclosed in U.S. Pat. No. 3,765,978, which patent is hereby incorporated by reference. Two examples of the fabric in accordance with the invention will be given wherein the warp and filling yarns are reversed from that shown in FIG. 1, i.e., the fibers of the filling yarns are comprised of Teflon fibers.

EXAMPLE ONE

A satin weave fabric can be produced comprising a 200 denier 100 filaments Nomex warp yarn, type 430, 6.0 twists per inch ("tpi") and a multi-component filament filling yarn comprising a 200 denier, 30 filament Teflon yarn and 200 denier, 100 filament Nomex yarn twisted together with 6.0 tpi. After weaving, the fabric is thoroughly washed in boiling water to remove any water soluble sizing. The fabric is then dried and suitably coated with a resin adhesive. As described above and as set forth in the U.S. Pat. No. 3,765,978, the adhesive may be a solvent based phenolic resin, epoxy, FEP or polyimide. The resin is then partially cured or so-called "B" staged so that it has a dry feel and can be readily handled. The "B" staged liner can now, if desired, be cut to size and be bonded to a supporting member such as a support disk by applying additional resin together with heat and pressure in a heated press. The resulting brake tensioning plate will exhibit superior wear and slip characteristics when compared to a PTFE resin face or a Nomex fabric face.

EXAMPLE TWO

Figure 13:
FIG. 13 is a diagrammatic front view of a disk fabricated from thin strips of the fabric in accordance with the invention; and, FIG. 14 is a side view of FIG. 13.
Figure 14:
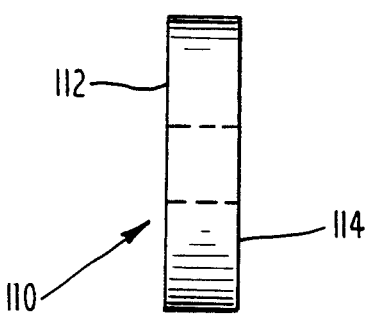

The fabric is the same as that in Example One except that PEEK fibers are used (175 denier, 20 filaments) in place of Nomex yarn and the material after "B" staging is cut in strips and spirally wound and press cured in a heated mold to produce the disk illustrated in FIGS. 13 and 14.

Figure 3:
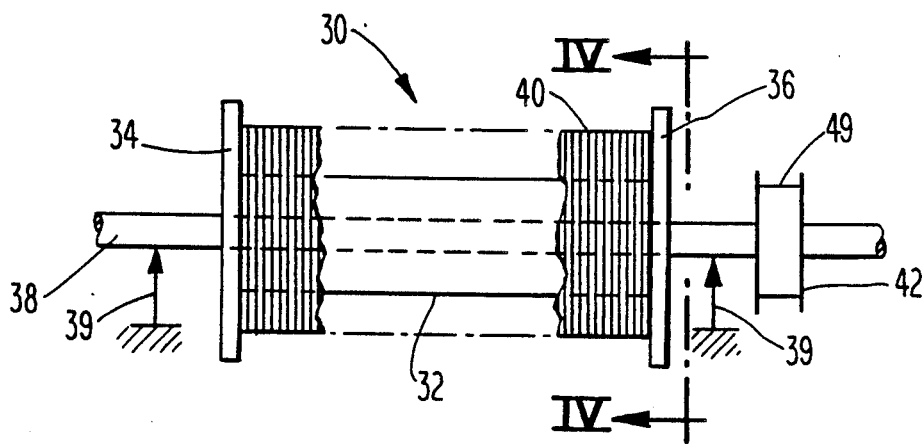
FIG. 3 illustrates in diagrammatic form, a beam on which yarn or paper is wrapped and a brake wheel.
Figure 4:
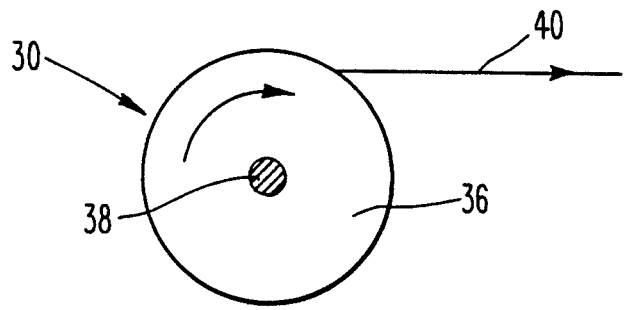
FIG. 4 is a side view taken along the line IV—IV of FIG. 3.

Referring now to FIG. 3, FIG. 3 illustrates in diagrammatic form a beam shown generally at 30 on which yarn, paper or the like may be wound. The beam 30 includes a core or center member 32 on which the material is actually wound and opposite end members 34 and 36. A shaft 38 extends through the beam to which the center member 32 is affixed. The shaft 38 is rotatably supported in some fashion by suitable support means represented in FIG. 3 by the arrows 39. In operation, the shaft 38 and center member 32 rotate as a unit. Material, designated by the reference numeral 40, is shown as being wound on the center member 32. In FIG. 4, the material 40 is designated as being unwound from the beam 30 as the beam 30 rotates in the direction of the arrow, i.e., clockwise. Mounted on the right side of shaft 38 to rotate therewith is a brake wheel 42.

Figure 5:
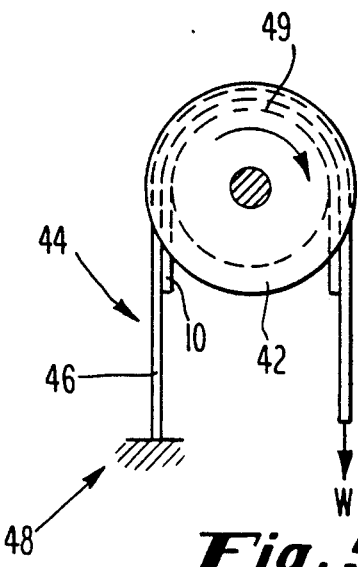
FIG. 5 illustrates in diagrammatic form a supported brake band according to the invention as applied to the brake wheel shown in FIG. 3.
Figure 6:
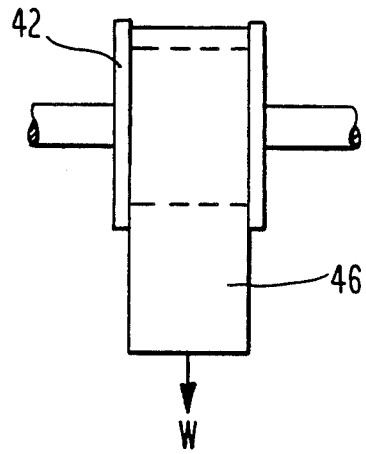
FIG. 6 is a side view of FIG. 5.

As shown in FIGS. 5 and 6, the brake wheel 42 has applied thereto friction tensioning apparatus or break means shown generally at 44. The friction apparatus or break means 44 comprises a brake band comprising a supporting member or band 46 of steel or other suitable material and a liner member 10, as described above, secured to the supporting member or band 46 by an adhesive or other suitable means. The brake band 46 is shown as secured at one end thereof as at 48, to a fixed support and at the other end thereof, has an adjustable force applied thereto such as, for example, by a weight, as designated by the letter W.

During operation, as material is unwound from the beam 30, the beam 30 rotates in a clockwise direction, as seen in FIG. 4, and since the liner member 10 is in frictional contact with the periphery 49 of brake wheel 42, the frictional force on the periphery 49 of brake wheel 42 developed by the sliding movement of the periphery 49 of the brake wheel 42 under the frictional surface of the liner member 10 effects a braking or tensioning action on the rotation of the beam 30 with the result that material 40 being unwound from the beam 30 is maintained under tension. As will be understood to those skilled in the art, the force applied to the end of the brake means 44 or weight W maintains the liner member 10 in frictional contact with the periphery 49 of brake wheel 42. As the material 40 is unwound from the beam 30, this force or weight must be varied due to the changing radius of the material 40 on the beam 30 in order to maintain a relatively constant tensioning or braking action on brake wheel 42. If the unwinding of the material 40 is very, very slow, then the weight W can be changed by hand. If, however, the material is unwound at a rapid pace, then automatic weight adjusting means or some other suitable means such as, for example, a regulated air cylinder, can be utilized to apply a force to the end of the brake means 44. In this manner, the brake means 44 permits sliding movement of the rotating brake wheel 42 with respect thereto and the force applied to the end of the brake means 44 maintains the friction surface of the liner 10 in contact with the rotating brake wheel 42 for effecting a relatively constant tensioning or braking effect on the rotating brake wheel 42.

Figure 7:
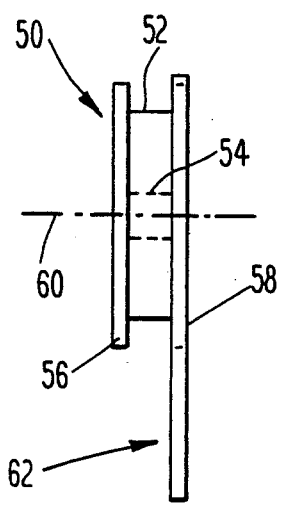
FIG. 7 illustrates in diagrammatic form an unsupported brake band according to the invention as applied to a spool on which woven tape, yarn, paper or the like is wrapped.

Referring now to FIG. 7, a spool is shown generally at 50 on which a woven tape or other material 52 is wound. The spool 50, like beam 30, includes a core or center member 54 and opposite end members 56 and 58.

Figure 8:
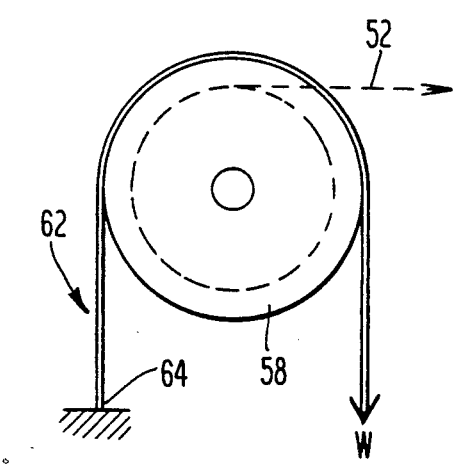
FIG. 8 is a side view of the spool shown in FIG. 7.

The spool 50 is rotatably supported by means (not shown) for rotation about an axis 60 passing through the center of member 54. As shown in FIG. 8, the end member 58 has applied thereto break or tensioning means or brake band shown generally at 62. The break or tensioning means 62 comprises an unsupported strip of liner member lo, as described above. As in the case of the break or tensioning means 44 of FIG. 5, break means 62 is shown as secured at one end thereof, as at 64, to a fixed support and at the other end thereof, has an adjustable force applied thereto such as, for example, by a weight W. The essential difference between the brake means 44 and 62 is that brake means 62 is unsupported, i.e., it does not have a member comparable to supporting member or band 46. Otherwise, operation of the break means 62 is the same as that given above with reference to brake means 44.

Figure 9:
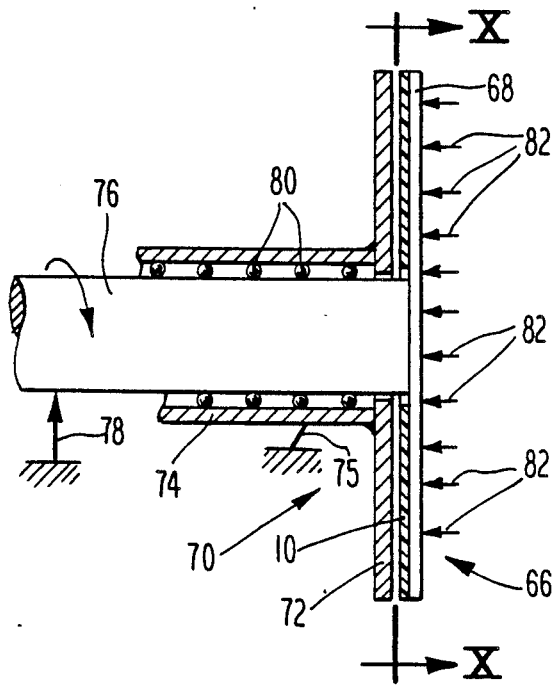
FIG. 9 is a diagrammatic fragmentary vertical sectional view of a brake disk according to the invention.
Figure 10:
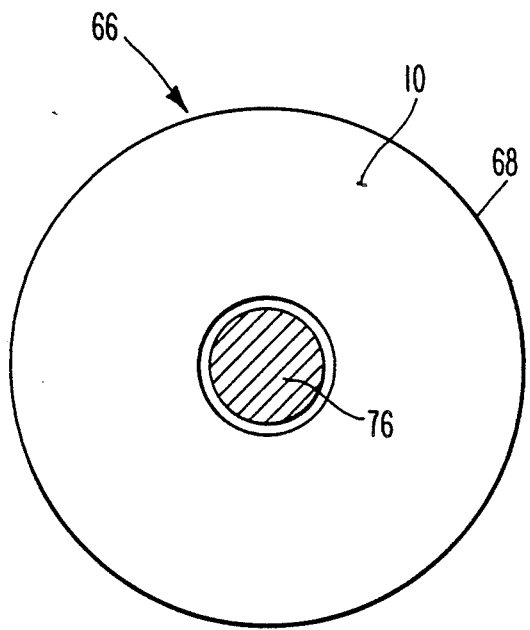
FIG. 10 is a view taken along the line X—X of FIG. 9.

Referring now to FIGS. 9 and 10, FIG. 9 illustrates a diagrammatic fragmentary vertical sectional view of a friction or brake disk, shown generally at 66. The friction or brake disk 66 comprises an annular supporting disk 68 to which is secured an annular liner member 10. The liner member 10 is attached or secured to supporting disk 68 as by bonding with a suitable adhesive, rivets, screws or other suitable means. Also illustrated in FIG. 9 in diagrammatic form is a member, shown generally at 70, with which brake disk 66 coacts. Member 70 comprises a annular metal plate 72 to which is welded, or otherwise secured, a tubular member 74. Together, the members 72 and 74 are fixed against rotation as indicated at 75 and would form a part of a larger piece of equipment or machinery, not shown.

The disk 68 is secured to a shaft 76 which is mounted for rotation, as designated by the arrow 78, and disk 68 rotates with shaft 76. As diagrammatically illustrated in FIG. 9, roller bearings 80 are provided between tubular member 74 and shaft 76. The arrows 82 in FIG. 9 indicate the application of a force or pressure against brake disk 66 to effect frictional engagement between annular liner member 10 and the annular surface of annular metal plate 72.

In operation, assuming shaft 76 to be rotating, with the application a pressure or force on disk 66 to bring liner member 10 into frictional contact with member 72, there will be effected braking action on the rotation of shaft 76 due to the frictional force developed by the sliding movement of the liner member 10 against the annular surface of plate 72. By adjusting the pressure or force on disk 66, a constant braking effect can be achieved. It is to be understood that the term "braking effect" as used herein is to be construed in its broadest sense, i.e., to include a slowing, tensioning, slip or sliding action and not be limited solely to a stopping action. The pressure could be applied to the disk 66 in a member of a well known ways and by various apparatus. As for example, the pressure may be applied by weights, springs, air diaphragms, fluid diaphragms or by electromagnetic means.

Figure 11:
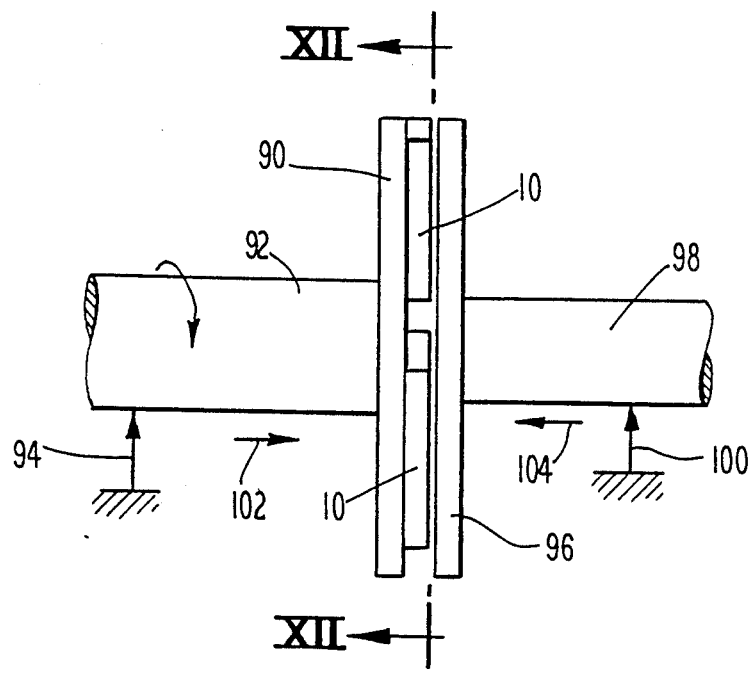
FIG. 11 is a diagrammatic fragmentary vertical sectional view of a friction disk or clutch or torque limiter apparatus in accordance with the invention.
Figure 12:
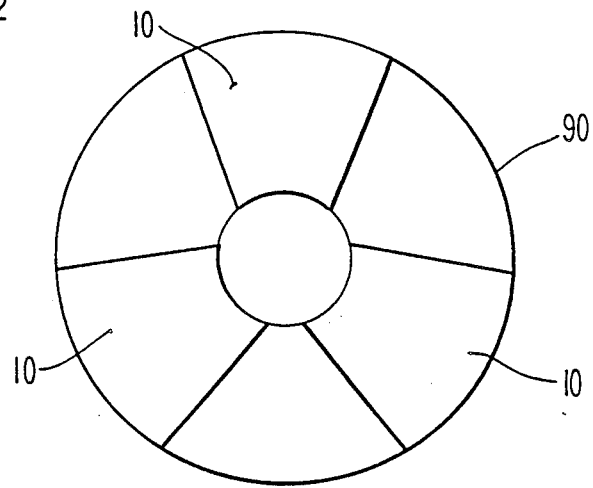
FIG. 12 is a view taken along the line XII—XII of FIG. 11.

Referring now to FIGS. 11 and 12, FIG. 11 illustrates a friction disk or clutch or torque limiter apparatus in accordance with the invention. The apparatus shown in FIG. 11 comprises an annular disk 90 secured to a shaft 92. Shaft 92 and disk 90 are mounted for rotation as indicated by the arrow 94. Bonded or otherwise secured to the disk 90 are a plurality of liner members 10 in the form of segments. A second annular disk 96 is secured to a shaft 98. The shaft 98 and disk 90 are mounted for rotation as indicated by the arrow 100. While the liner members 10 have been illustrated as secured to the disk 90 they could just as easily be secured to the disk 96. For reference purposes, the shaft 92 and disk 90 will be considered a rotating driving member which may be driven directly or indirectly by an suitable means, as for example, by an electric motor, and disk 96 and shaft 98 will be considered a rotating driven member. In addition to being mounted for rotation, either or both shafts 96, 98 can be mounted for relative horizontal movement as indicated by the arrows 102 and 104 in order to effect relative movement of disks 90 and 96 towards and away from each other. It should be understood that, while lining members 10 have been shown as secured to disk 90, lining members 10 may be secured to disk 96. Further, while disks 90 and 96 are shown as single disks, they may each comprise a plurality of interleaved disks with a plurality of lining members 10 secured to either the plurality of disks 90 or to the plurality of disks 96.

In operation, with shaft 92 being driven and with liner member 10 in frictional contact with disk 96, disk 96 and shaft 98 will rotate and be driven due to the clutching action effected by the liners 10 on the surface of the disk 96. As will be understood to those skilled in the art, the apparatus illustrated in FIGS. 11 and 12, in addition to being representative of a clutch means, can also be considered as representative of a torque limiting means or device. With the proper selection of operating parameters, i.e., the driving forces and the coefficient of friction of the lining members 10, the driving member (shaft 92 and disk 90) can be arranged to effect relative slippage between the driving member and the driven member (disk 96 and shaft 98) when input torque to the driven member exceeds a predetermined value or the load on the driven member exceeds a predetermined value.

Referring now to FIGS. 13 and 14, FIG. 13 is a diagrammatic front view of disk 110 fabricated from thin strips of the sheet liner material described herein and exemplified in FIG. 1. To fabricate the disk 110, the sheet liner material can be cut or slit into narrow strips or tapes. Continuous lengths of the tape can then be wound on a mandrel to form the disk 110. Thereafter, the disk 110 would be inserted into a suitable heated mold cavity for press curing into a solid disk as shown in FIGS. 13 and 14. Portions of the fluorine fibers used to construct the sheet liner material would be presented, together with portions of other fibers utilized to make the fabric of the liner, at the opposite surfaces 112 and 114. The surfaces 112 and 114 provide friction surfaces as hereinbefore described. The disk 110 can be used alone or may be bonded or otherwise secured to a support member.

Lining members according to the invention when forming a part of tensioning devices, brakes, clutches, torque limiters or other suitable friction apparatus offer significant advantages. The liner in accordance with the invention is lightweight and because the combination of yarn types and resin types utilized produces a hard wearing material, the liner can be used in thin sheets. Because the liner sheets are thin, they are not only lightweight and cost effective, but also have good thermal properties and allow heat to dissipate from the friction face or surface to the backing of the liner. Lining members in accordance with the invention have been tested to have a uniform coefficient of friction through a temperature range from about 65° F. to about 300° F. and depending on the resin system, it is believed can have a uniform coefficient of friction through a temperature range from about 65° F. to about 500° F. Furthermore, high operating pressures can be applied to the liner without causing significant deformation or cold flow. This characteristic provides for accurate torque settings because minor adjustments to the applied pressure do not result in major changes in the torque as would occur if cold flow occurred and only low pressure settings could be used as in the case with a non-fabric or straight PTFE resin sheet. In accordance with the invention the lining members 10 have static and dynamic coefficients of friction which are substantially equal thereby eliminating stick-slip operation in the types of apparatus in which they are employed.

From the foregoing, it will be understood that the liner member 10 can be utilized in various apparatus such as tensioning devices, brakes, clutches, torque limiters and the like and in applications wherein it is desired to have a uniform or constant tensioning or slip friction surface for effecting braking, clutching or torque limiting action. It will also be understood that, while the liner member 10 has been described in detail above as comprising a woven fabric, the invention is not so limited as the fabric may also be non-woven, braided or knitted if so desired. The incorporation of heat and wear resistant fluorine fibers in such fabrics will also produce liner member having the desired constant slip friction surface in accordance with the invention.

It will be appreciated that while particular embodiments of the invention have been shown and described, obviously many modifications and variations of the present invention are possible in light of the above teachings. It is therefore to be understood that within the scope of the appended claims the invention may be practiced otherwise than as specifically described.

We claim:

1. Apparatus comprising a rotating member and braking means adapted to be disposed in frictional contact with said rotating member during braking action, said braking means comprising a liner having a friction surface, said liner including a fabric having polytetrafluoroethylene fibers, said liner also comprising a resin.

2. Apparatus according to claim 1 wherein said fabric is woven and further includes reinforcing fibers and said resin is a cured synthetic resin.

3. The apparatus according to claim 2 wherein said liner comprises static and dynamic coefficients of friction which are substantially equal whereby stick-slipping is substantially avoided during said frictional contact.

4. The apparatus of claim 3 wherein said liner is secured to a support member.

5. The apparatus of claim 4 wherein said rotating member comprises a center member for winding sheet-like material and a rotating brake wheel laterally disposed from said center member.

6. The apparatus of claim 5 wherein said liner is disposed in frictional contact with said brake wheel to enable said center member to provide constant tension on said material during said winding operation.

7. The apparatus of claim 6 wherein said support comprises a band disposed around a portion of said brake wheel.

8. Apparatus according to claim 2 wherein said rotating member and said braking means have disk-shaped surfaces adapted to be disposed in frictional contact.

9. An apparatus having a rotating member and braking means operatively coupled to said rotating member for effecting a braking effect on said rotating member, the improvement comprising:
friction means, said friction means comprising a part of said braking means and comprising:
(i) a fabric having polytetrafluoroethylene fibers, and
(ii) a resin.

10. An apparatus according to claim 9 wherein the coefficient of friction of said friction means is sufficiently low to permit sliding movement of said rotating member with respect to said braking means and means for maintaining said friction means in contact with said rotating member and for effecting a relatively constant braking effect on said rotating member.

11. An apparatus according to claim 10 wherein said fabric is woven and further includes reinforcing fibers and said resin is a cured synthetic resin.

12. Apparatus comprising a rotating member and a lining member operatively coupled to said rotating member for effecting a frictional engagement between said rotating member and said lining member, said lining member comprising a sheet-like body with a friction surface, said body including a woven fabric constructed to present at said surface a yarn comprising polytetrafluoroethylene fibers, said body also comprising a cured synthetic resin.

13. Apparatus according to claim 12 wherein the coefficient of friction of said woven fabric is sufficiently low to permit sliding movement of said rotating member with respect to said lining member, and means for maintaining said lining member in contact with said rotating member.

14. Apparatus according to claim 13 further comprising a support member, said lining member being secured to said support member.

15. Apparatus according to claim 12 wherein said rotating member and said lining member have disk-shaped surfaces adapted to effect frictional engagement.

* * * * *